United States Patent [19]

Zyogahara et al.

[11] Patent Number: 4,943,263

[45] Date of Patent: Jul. 24, 1990

[54] STRUCTURE FOR MOUNTING DAMPER ON ROTARY SHAFT

[75] Inventors: Masakazu Zyogahara; Shinichi Yokoyama; Hisashi Yamanaka, all of Toyota, Japan

[73] Assignee: Toyota Jidosha Kabushiki Kaisha, Japan

[21] Appl. No.: 327,527

[22] Filed: Mar. 23, 1989

[30] Foreign Application Priority Data

Apr. 18, 1988 [JP] Japan ............................ 63-51970[U]

[51] Int. Cl.$^5$ ............................................ F16F 15/10
[52] U.S. Cl. ...................................... 464/180; 74/574; 188/379
[58] Field of Search .................. 188/378, 379; 74/574; 464/180

[56] References Cited

U.S. PATENT DOCUMENTS

| 3,074,293 | 1/1963 | Langsetmo | 464/180 X |
| 3,163,117 | 12/1964 | Haentjens | 74/574 X |
| 3,545,301 | 12/1970 | Richter | 74/574 |
| 4,223,565 | 9/1980 | Sugiyama et al. | 74/574 |

FOREIGN PATENT DOCUMENTS 61-201937 12/1986 Japan .
62-190145 12/1987 Japan .
62-194952 12/1987 Japan .

Primary Examiner—Daniel P. Stodola
Attorney, Agent, or Firm—Kenyon & Kenyon

[57] ABSTRACT

A damper consisting of two damper pieces capable of being disposed around a rotary shaft and two sets of bolts and nuts. The damper is mounted on the rotary shaft by connecting the two damper pieces by the bolts and nuts. Each of the damper pieces has a mass portion having an inner peripheral surface diverging toward an opening end so as to be out of contact with the rotary shaft and a mounting portion having rigidity lower than that of the mass portion and adapted to be in contact with the rotary shaft when the damper is mounted on the rotary shaft.

10 Claims, 5 Drawing Sheets

STRUCTURE FOR MOUNTING DAMPER ON ROTARY SHAFT

BACKGROUND OF THE INVENTION

1. Field of the Invention

This invention relates to a structure for mounting a damper on a rotary shaft such as a drive shaft, propeller shaft and the like for a vehicle.

2. Description of the Prior Art

For the purpose of reducing vibration and noise of a drive line, there is a case where a mass damper is mounted on a rotary shaft such as a drive shaft and a propeller shaft (FORD FIESTA WORKSHOP MANUAL, '83.7, for example). This mass damper, as shown in FIG. 9 or 10, consists of two damper pieces 2. Each damper piece 2 is disposed around a rotary shaft 1, bolts 3 are inserted into the respective opposite ends and nuts 4 are screwed onto the bolts 3. Thus, the damper pieces 2 are mounted on the rotary shaft 1. Under such a mounting condition, an inner peripheral surface 5 of each damper piece 2 is brought into contact with the rotary shaft 1, so that the mass damper is held by the rotary shaft 1 with frictional force of contact portions. The inner peripheral surface 5 of each damper 2 is formed to have a V-shaped section. As shown in FIG. 10, the inner peripheral surface 5 of the damper piece 2 may be formed into a cylindrical surface to conform to a surface of the rotary shaft 1.

When the rotary shaft is twisted at the time of transmission of torque, relative displacement or relative slip occurs between the inner peripheral surface of each damper piece and the rotary shaft in the damper as noted above. Since the relative displacement or slip occurs repeatedly, fretting is generated.

SUMMARY OF THE INVENTION

Accordingly, an object of the present invention is to provide a damper mounting structure for preventing the generation of fretting by restraining the relative displacement between an inner peripheral surface of a damper and a rotary shaft to be as small as possible when the rotary shaft is twisted at the time of transmission of torque.

A damper mounting structure according to the present invention comprises a damper consisting of a plurality of damper pieces capable of being disposed around a rotary shaft and a plurality of connecting means. Each damper piece has a mass portion which is out of contact with the rotary shaft and a mounting portion having rigidity lower than that of the mass portion and mounted on the rotary shaft. The respective mounting portions of the adjacent damper pieces are connected with each other by the connecting means.

In a preferred embodiment, an inner peripheral surface of the mass portion of each damper piece is formed as an inclined surface diverging toward an opening end. A portion of the rotary shaft, on which the damper pieces are mounted, opposite to the mass portion is formed to have a diameter smaller than that of a portion of the rotary shaft opposite to the mounting portion.

When the rotary shaft is twisted at the time of transmission of torque, the mounting portion which is formed to be low in rigidity follows torsional deformation generated on the rotary shaft in a contact portion between the mounting portion of each damper piece and the rotary shaft subjected to deformation, so that no substantial relative slip between the mounting portion and the rotary shaft is generated, or is restrained to be small if generated. On the other hand, since the mass portion is out of contact with the rotary shaft, the relative slip is not generated. Thus, the generation of fretting can be prevented to improve the durability of the damper and rotary shaft.

BRIEF DESCRIPTION OF THE DRAWINGS

The foregoing and other objects and features of the invention will become apparent from the following description of preferred embodiments of the invention with reference to the accompanying drawings, in which:

FIGS. 1 through 6 show a first embodiment of the present invention, respectively, in which FIG. 1 is a perspective view showing an assembled damper, FIG. 2 is a sectional view showing the assembled damper, FIG. 3 is a side view showing a damper piece, FIG. 4 is a front view showing the damper piece, FIG. 5 is a bottom view showing the damper piece, and FIG. 6 is an enlarged-scale view showing a mounting portion of a rotary shaft mounting the damper pieces;

FIG. 8 shows a second embodiment of the damper piece of the present invention, in which FIGS. 9 and 10 show prior art dampers respectively, in which

DETAILED DESCRIPTION OF PREFERRED EMBODIMENTS

Figure 1:
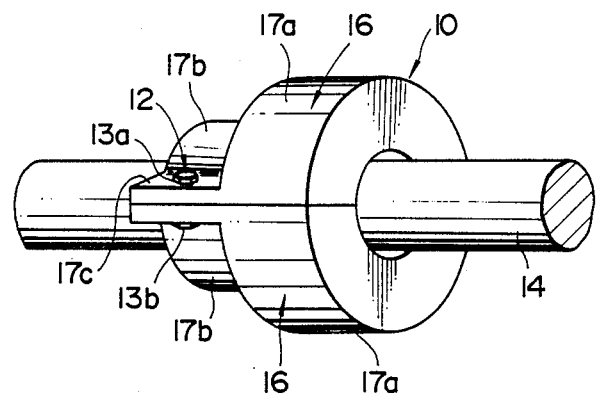

A damper mounting structure, as shown in FIG. 1, comprises a damper 10 and a plurality of connecting means 12. The damper 10 includes two damper pieces 16 formed to be disposed around a rotary shaft 14 and identical in shape with each other. As will be later described, these damper pieces 16 are disposed around the rotary shaft to be connected with each other by the connecting means 12. Thus, the damper 10 is mounted on the rotary shaft 14.

Two damper pieces 16 of the damper 10 are formed in mirror image relationship to one another about a plane including an axis of the rotary shaft 14. Each of the damper pieces 16 has, as one body, a mass portion 17a and a mounting portion 17b extending from the mass portion in an axial direction of the rotary shaft. The mass portion 17a and mounting portion 17b are generally semi-cylindrical in shape. However, the mounting portion 17b has a pair of flanges 17c extending from both sides of the mounting portion. As is apparent from FIG. 4, each of the flanges 17c extends to an outer diameter of the mass portion 17a. Each flange 17c is provided with a hole 18 for a bolt. The damper piece 16 is manufactured by means of casting.

The mounting portion 17b of each damper piece 16 is formed to have a thickness smaller than that of the mass portion 17a and rigidity lower than that of the mass portion 17a. That has, the mass portion 17a is enough thickness and axial length to ensure necessary mass for a mass damper, whereas the mounting portion 17b will only have strength enough to connect firmly the mass portion 17a with the rotary shaft 14, and its thickness and axial length are determined from this point of view. As a result, the rigidity of the mounting portion 17b is smaller than that of the mass portion 17a. Further, by establishing the torsional rigidity of the mounting portion 17b to be lower than that of the rotary shaft 14, the elastic deformation of the mounting portion 17b can more easily follow the deformation of the rotary shaft. When the thickness of the mounting portion is lessened and carbon steel for machine structural use and spheroidal cast iron are used respectively for the rotary shaft 14 and the damper piece 16, it is possible to attain torsional rigidity of the mounting portion 17b which is lower than that of the rotary shaft 14.

Figure 2:
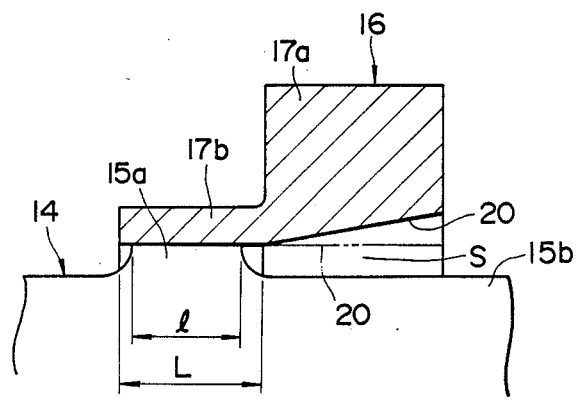
Figure 3:
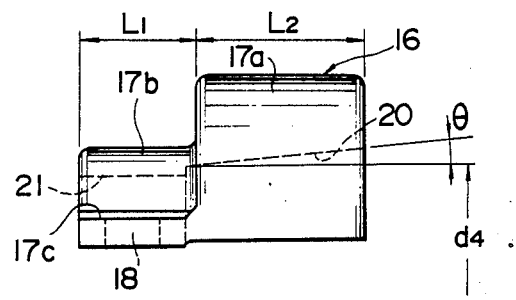
Figure 4:
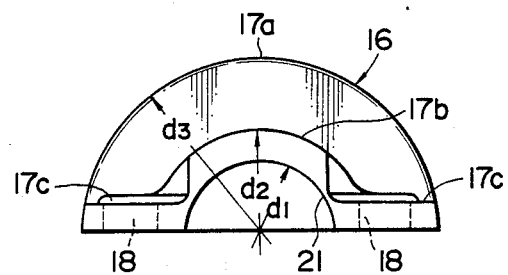
Figure 5:
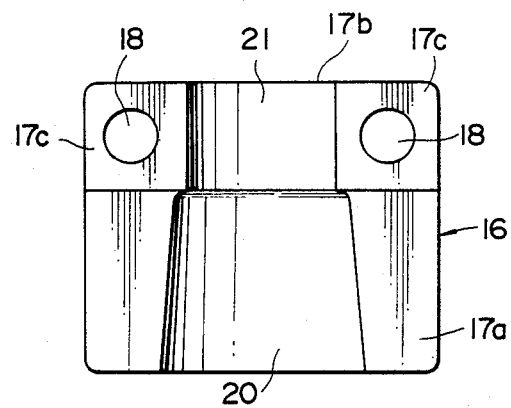

As is apparent from FIGS. 2, 3 and 5, an inner peripheral surface 20 of the mass portion 17a of each damper piece 16 is formed into a semi-conical surface diverging with an inclined angle $\theta$ from the mounting portion 17b toward an opening end. On the other hand, an inner peripheral surface 21 of the mounting portion 17b is a semi-cylindrical surface conforming to the profile of the rotary shaft as shown in FIG. 4.

An example which satisfies the requirements for the damper piece 16 is numerically expressed as in the following; $d_1=25$ mm, $d_2=35$ mm, $d_3=58$ mm, $d_4=29$ mm, $L_1=20$ mm, $L_2=28$ mm and $\theta=5°$ where the dimensions are defined as shown in FIGS. 3 and 4.

Figure 6:
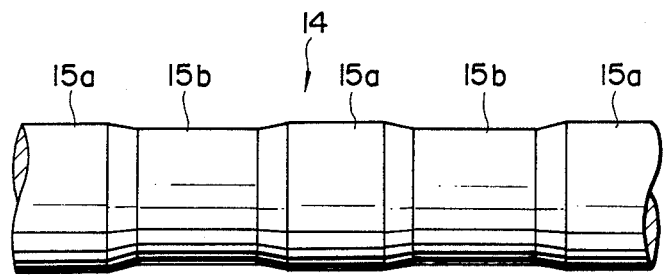

The damper piece 16 formed as mentioned above is preferably mounted on the rotary shaft 14 shown in FIG. 6. The rotary shaft 14 in the embodiment shown has a first portion 15a and at least two second portions 15b, each having a diameter smaller than that of the first portion 15a. The mounting portions 17b of two damper pieces 16 are brought into close contact with the first portion 15a provided between two second portions 15b and both damper pieces 16 are firmly fastened with the connecting means 12. In the embodiment shown in FIG. 1, each of the connecting means 12 includes a bolt 13a extending through the bolt hole 18 in the flange and a nut 13b screwed onto the bolt 13a. Use is made of a stud bolt as the bolt 13a while use is made of a rivet as the connecting means.

Since, as shown in FIG. 2, a clearance S is produced between the mass portion 17a and the rotary shaft 14 when damper piece 16 is mounted on the rotary shaft 14, the mass portion 17a is out of contact with the rotary shaft 14.

When the mounting portion 17b of each damper piece is connected with the first portion 15a of the rotary shaft 14, the torsional deformation of the rotary shaft 14 at the time of transmitting of torque appears largely on the second portion 15b, which is low in torsional rigidity, to thereby reduce the torsional deformation of the first portion 15a. Thus, the mounting portion 17b of each damper piece will be exposed to only a small degree of deformation, so that the mounting portion 17b easily follows the rotary shaft 14 to improve the effect upon prevention of fretting.

When the mounting portion 17b of each damper piece 16 is mounted on the rotary shaft 14 shown in FIG. 6, the length L of the mounting portion 17b is preferably set to be larger than the axial length l of the first portion 15a of the rotary shaft 14 as shown in FIG. 2. Thus, an edge of the mounting portion 17b on its free end is never in contact with the rotary shaft 14 to further improve the effect upon prevention of fretting. Also, the mounting portion 17b is adapted to follow the rotary shaft 14 to facilitate the elastic deformation.

As shown in FIGS. 2 and 3, when the inner peripheral surface 20 of the mass portion 17a of each damper piece 16 is provided with a conical surface diverging toward the opening end, even if foreign matters such as muddy water, dust and others intrude into the clearance S between the mass portion 17a and the rotary shaft 14, these foreign matters are easily purged to the outside by the action of centrifugal force. Thus, wear and corrosion due to the foreign matters can be restrained to improve the durability of the damper 10 and rotary shaft 14.

Figure 7:
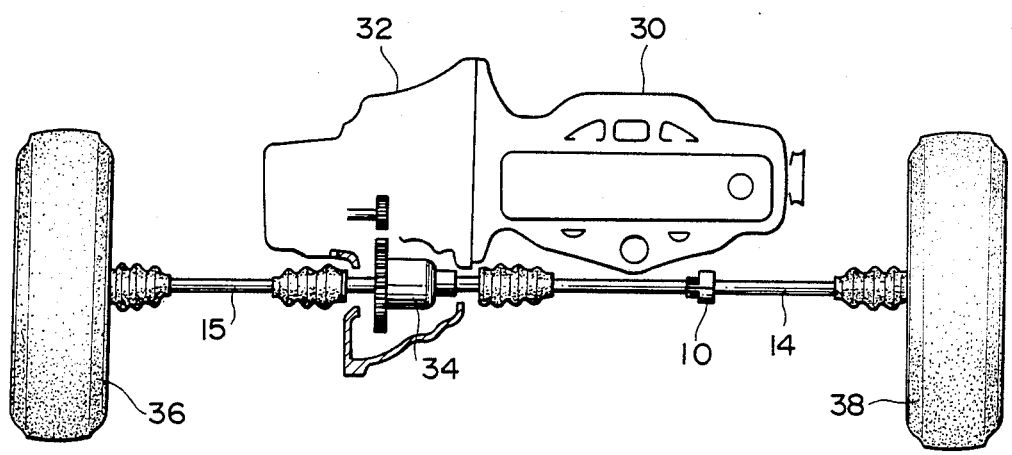
FIG. 7 is a general view of a front section of a vehicle showing a drive line of FF car.

As shown in FIG. 7 for example, the damper 10 is mounted on a rotary shaft in a drive line of a vehicle to function as a mass damper. The drive line well known per se is constituted from an engine 30, a transmission 32, a differential gear 34 and drive shafts which will be later described. In the embodiment shown, the differential gear 34 is located to be offset toward one side from the lateral center of the vehicle. The differential gear 34 is connected to left and right wheels 36,38 through the rotary shafts, i.e., drive shafts 14,15 so as to be capable of transmitting power. The right and left drive shafts 14,15 are different in length from each other, and the right drive shaft 14 is longer than the drive shaft 15. The mass damper 10 is mounted on the longer right drive shaft 14 having problems in vibration. The mounting position of the mass damper 10 is set to be approximately in the center of the drive shaft 14.

Figure 8A:
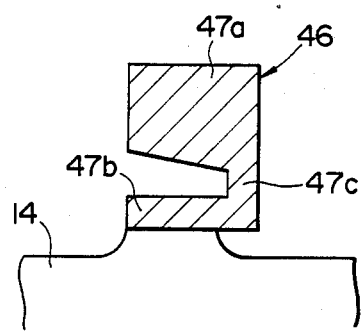
FIG. 8(a) is a sectional view showing an assembled damper piece and FIG. 8(b) is a front view showing the same.
Figure 8B:
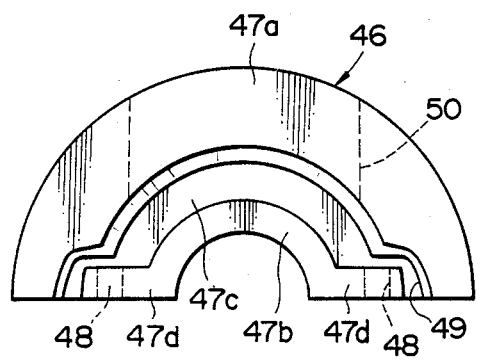
Figure 9A:
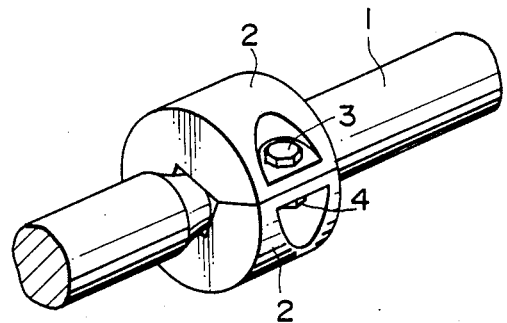
FIG. 9(a) is a perspective view showing an assembled damper.
Figure 9B:
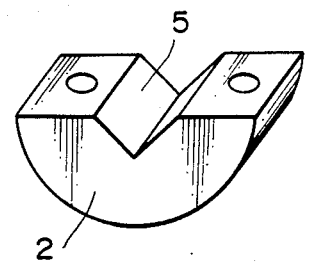
FIG. 9(b) is a perspective view showing a damper piece.
Figure 10A:
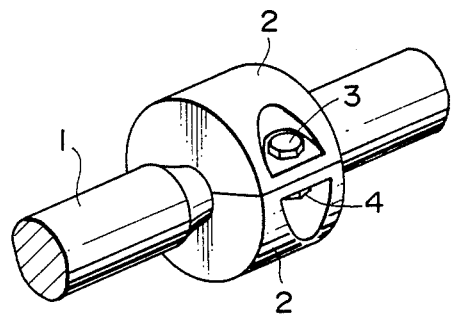
FIG. 10(a) is a perspective view showing another assembled damper and FIG. 10(b) is a perspective view showing a damper piece of the damper of FIG. 10(a).
Figure 10B:
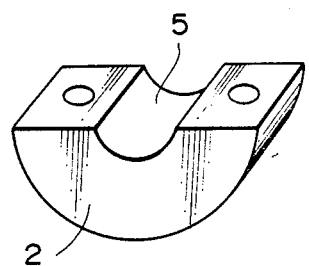

While a damper piece 46 shown in FIG. 8 is constituted by a mass portion 47a, a mounting portion 47b and a connecting portion 47c for interconnecting both portions, the mass portion 47a of the damper piece surrounds the radial outside of the mounting portion 47b. Bolt holes 48 are provided in flanges 47d of the mounting portion 47b. A part of the mass portion 47a opposed to the flange 47d is formed into a recess 49. A notch 50 is provided in a position of the mass portion 47a opposed to each bolt hole 48. This notch 50 can be formed similarly to the notch provided in order to attach bolt and nut thereto in the damper shown in FIG. 9 or 10.

Instead of the embodiment as noted above, the damper 10 may be constituted by connecting three damper pieces 16 circumferentially with each other. In this case, while an angle of center defined by a pair of flanges 17c is 120°, other constitution of the damper piece may be the same as that of the previously-described embodiment.

The inner peripheral surface 20 of the mass portion 17a of each damper piece 16 may be formed to be straight as shown by a dot-dash imaginary line in FIG. 2. Then, the portion of the rotary shaft 14 opposed to the mass portion is formed to have the diameter smaller than that of the portion of the rotary shaft opposed to the mounting portion. On the other hand, the rotary shaft 14 may have a uniform diameter equal to that of the first portion 15a. In this case, the inner peripheral surface of the mass portion of each damper piece 16 is formed into an inclined surface diverging toward the opening end as shown in FIGS. 2 and 3.

While the damper 10 is used as a mass damper in the embodiments as noted above, the present invention can be exploited even if the damper is used for a dynamic damper instead of a mass damper.

What is claimed is:

1. A damper for mounting on a rotary shaft, the damper consisting of a plurality of damper pieces capable of being disposed in circumferentially adjacent relation around the rotary shaft and a plurality of connecting means for connecting circumferentially adjacent damper pieces with each other on said rotary shaft, wherein each of said damper pieces consists of a single piece of homogeneous material and is formed to have a mass portion that is out of contact with said rotary shaft and a mounting portion having rigidity less than that of the mass portion and in contact with said rotary shaft when the damper is mounted on the shaft.

2. A damper for mounting on a rotary shaft as claimed in claim 1, wherein torsional rigidity of said mounting portion of said damper piece is less than torsional rigidity of said rotary shaft on which the damper is to be mounted.

3. A damper for mounting on a rotary shaft as claimed in claim 1, wherein said mounting portion of said damper piece extends from said mass portion in an axial direction of said rotary shaft when the damper is mounted on the shaft.

4. A damper for mounting on a rotary shaft as claimed in claim 3, wherein said mass portion of each damper piece has an inner peripheral inclined surface diverging toward an opening end of the damper piece.

5. A damper for mounting on a rotary shaft as claimed in claim 1, wherein said mass portion of said damper piece is located radially outward of said mounting portion.

6. A damper for mounting on a rotary shaft as claimed in claim 1, wherein said rotary shaft is provided with a first portion, to which said mounting portion of said damper piece is adapted to be fixedly attached, and a second portion opposed to said mass portion of said damper piece.

7. A damper for mounting on a rotary shaft as claimed in claim 6, wherein the diameter of said second portion is smaller that of said first portion.

8. A damper for mounting on a rotary shaft as claimed in claim 7, wherein said rotary shaft has a third portion having the same diameter as said second portion and separated axially from said second portion by said first portion.

9. A damper for mounting on a rotary shaft as claimed in claim 8, wherein the axial length of said first portion of said rotary shaft is shorter that the axial length of said mounting portion of said damper piece.

10. A damper for mounting on a rotary shaft, the damper consisting of two damper pieces capable of being disposed around the rotary shaft and two connecting means for connecting said two damper pieces with each other on said rotary shaft, wherein each of said damper pieces has a mass portion having an inner peripheral surface diverging toward an opening end so as to be out of contact with said rotary shaft and a mounting portion having rigidity less than that of the mass portion and adapted to be in contact with said rotary shaft when the damper is mounted on the rotary shaft, and wherein said rotary shaft has a first portion, to which said mounting portion of said piece is adapted to be fixedly attached, a second portion opposed to said mass portion of said damper piece and having a diameter smaller than that of said first portion, and a third portion provided on the opposite side of said first portion from said second portion and having the same diameter as said second portion.

\* \* \* \* \*

UNITED STATES PATENT AND TRADEMARK OFFICE
CERTIFICATE OF CORRECTION

PATENT NO. : 4,943,263

DATED : 24 July 1990

INVENTOR(S) : ZYOGAHARA, et al.

It is certified that error appears in the above-identified patent and that said Letters Patent is hereby corrected as shown below:

Column 2, line 66: change "That has, the" to --That is, the--

Column 2, line 66: change "is enough" to --has enough--

Column 3, line 34: change "15b , each" to --15b, each--

Column 6, line 5: change "smaller that" to --smaller than that--

Column 6, line 13: change "that" to --than--

Signed and Sealed this

Seventeenth Day of March, 1992

Attest:

HARRY F. MANBECK, JR.

*Attesting Officer*     *Commissioner of Patents and Trademarks*